(12) United States Patent
Varela

(10) Patent No.: US 6,698,553 B2
(45) Date of Patent: Mar. 2, 2004

(54) DISC BRAKE CHAMBER ADAPTER

(75) Inventor: Tomaz Dopico Varela, Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 10 days.

(21) Appl. No.: 10/107,699

(22) Filed: Mar. 27, 2002

(65) Prior Publication Data

US 2003/0183462 A1 Oct. 2, 2003

(51) Int. Cl.[7] .............................................. F16D 65/28
(52) U.S. Cl. ..................... 188/72.9; 188/72.6; 188/72.7
(58) Field of Search .............................. 188/72.7, 72.9, 188/72.6, 106 F, 72.4; 74/107, 110; 92/129

(56) References Cited

U.S. PATENT DOCUMENTS

| | | | |
|---|---|---|---|
| 4,181,199 A | * | 1/1980 | Flotow et al. |
| 4,235,312 A | * | 11/1980 | Garrett et al. ............. 188/72.7 |
| 4,727,964 A | | 3/1988 | Weber et al. |
| 5,582,273 A | | 12/1996 | Baumgartner et al. |
| 6,332,514 B1 | * | 12/2001 | Chen ........................ 188/72.7 |

FOREIGN PATENT DOCUMENTS

| | | | |
|---|---|---|---|
| EP | 523439 A1 | * | 1/1993 |
| GB | 2102088 | * | 1/1983 |
| WO | 99/14515 | * | 3/1999 |

* cited by examiner

Primary Examiner—Douglas C. Butler
(74) Attorney, Agent, or Firm—Carlson, Gaskey & Olds, PC

(57) ABSTRACT

A vehicle brake assembly includes a disc that rotates about a lateral axis. A caliper is mounted to a non-rotating vehicle structure and supports a pair of brake pads that are positioned on opposing sides of the disc. An air chamber provides an actuation force for the brake assembly. A first actuator applies a force in a first direction parallel to the lateral axis to bring the brake pads into engagement with the disc during a braking operation. The air chamber includes a second actuator that applies a force in a second direction transverse to the lateral axis in response to a vehicle input. An adapter is operably coupled to the first and second actuators to translate the force applied in the first direction to the force applied in the second direction. The adapter includes a housing that is mounted to the caliper and a lever that pivots relative to the housing. The lever has one end connected to the first actuator and another end connected to the second actuator. With the use of the adapter, the air chamber can be installed in any of a plurality of installment positions that extend radially outward from the lateral axis.

20 Claims, 2 Drawing Sheets

DISC BRAKE CHAMBER ADAPTER

BACKGROUND OF THE INVENTION

This invention generally relates to a method and apparatus for translating a longitudinally applied brake input force from an air chamber into a laterally applied brake input force to bring brake pads into braking engagement with a rotating disc.

The operation of air disc brake assemblies is well known. A disc is mounted to a rotating wheel component for rotation about a lateral axis and a caliper is mounted to a non-rotating vehicle component. The caliper supports and positions a pair of brake pads on opposing sides of the disc. An actuating mechanism brings the brake pads into engagement with the disc in response to a braking input command. The actuating mechanism includes an air chamber that applies the force to bring the pads into contact with the disc.

Traditionally, brake manufacturers provide air chambers that can be installed in either an axial position or a radial position. The axial positions extend in a direction generally parallel to the lateral axis and the radial positions extend in a direction radially outward from the lateral axis. These positions make packaging on certain types of vehicles, especially low floor buses, very difficult and can result in intrusion to the bus aisle width.

In an attempt to address packaging difficulties, brake manufacturers have also provided brake chamber tangential mounting configurations at increased cost and complexity. Further, this installment position typically requires the air chamber to be positioned close to the wheel, which is not desirable for all vehicle applications.

Additionally, axle manufacturers are often required to package the air chamber into various different installment positions to meet varying OEM specifications. Thus, one axle assembly could have several different air disc brake assemblies installed in multiple different positions. This requires significant engineering time to re-package and design mounting interfaces for the air disc brake assembly and may even require modification of the axle assembly itself, which significantly increases cost and part proliferation.

Thus, it is desirable to provide an air disc brake assembly that can be mounted in a plane parallel to a wheel while still generating an axial input braking force and which can be easily installed in a variety of installment positions as well as overcoming the other above mentioned deficiencies with the prior art.

SUMMARY OF THE INVENTION

A vehicle brake assembly includes a disc that rotates about a lateral axis and a pair of brake pads that are positioned on opposing sides of the disc. The brake pads are supported by a caliper that is mounted to a non-rotating vehicle component. A first actuator applies a force in a first direction parallel to the lateral axis to bring the brake pads into engagement with the disc during a braking operation. A second actuator generates a force in a second direction transverse to the lateral axis in response to a brake input command. An adapter is used to convert the force applied in the second direction into a force applied in the first direction.

In a disclosed embodiment, the rotating disc rotates within a first plane and an air chamber is mounted in a second plane that is spaced apart from and parallel to the first plane. The air chamber is responsive to brake input commands operates the second actuator.

Also, the adapter allows the air chamber to be mountable in a plurality of installment positions. The installment positions preferably extend out radially from the lateral axis and include at least one tangential installment position with the air chamber extending tangentially relative to the disc.

In the preferred embodiment, the adapter includes a lever having one portion connected to the first actuator and another end connected to the second actuator. The lever is pivotally supported on a pin. An adapter housing is mounted to the caliper with the lever being substantially enclosed within the housing.

The subject invention provides a brake assembly that can be easily packaged in multiple different mounting configurations without requiring significant redesign of an axle. Further, the subject invention provides a simplified method and apparatus for converting a longitudinally applied brake force into a laterally applied brake input force to allow an air chamber to be mounted parallel to a wheel. These and other features of the present invention can be best understood from the following specifications and drawings, the following of which is a brief description.

DETAILED DESCRIPTION OF A PREFERRED EMBODIMENT

Figure 1:
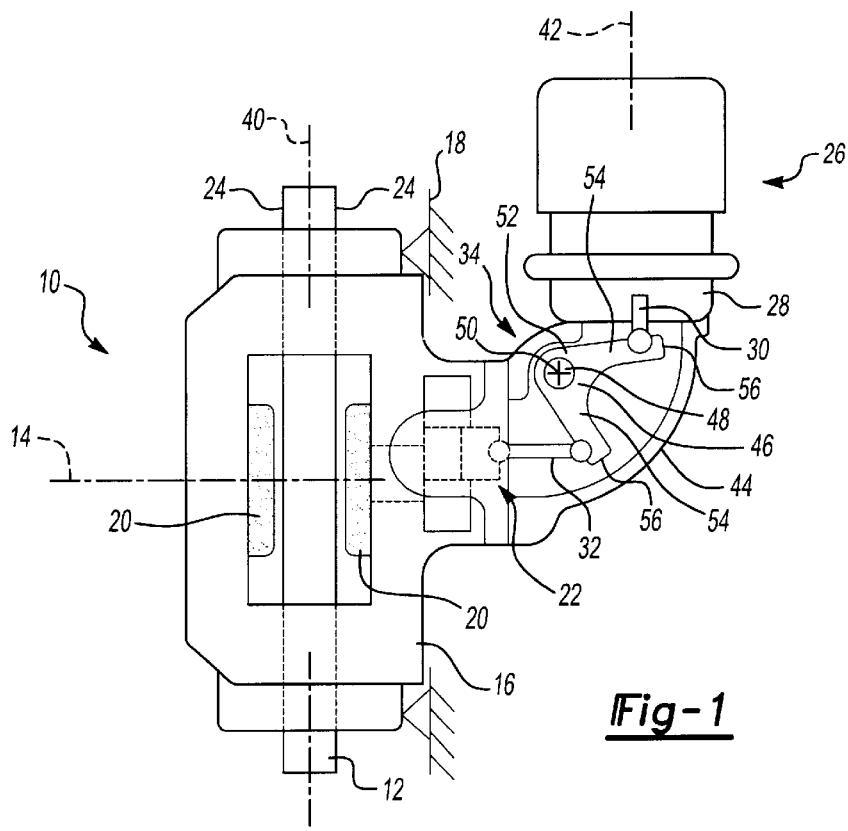
FIG. 1 is a top view of a brake assembly incorporating the subject invention.

A vehicle disc brake assembly is shown generally at 10 in FIG. 1. The brake assembly 10 includes a rotating rotor or disc 12 that defines a lateral axis of rotation 14 and a caliper 16 mounted to a non-rotating vehicle structure 18 as is known in the art. The caliper 16 supports a pair of brake pads 20 on opposing sides of the disc 12 and includes an actuating mechanism, shown generally at 22, that operates to move the brake pads 20 into engagement with the disc 12 in response to a brake input command. The actuating mechanism 22 can be any of various known actuating mechanisms known in the art including, but not limited to, a single piston configuration and a dual piston configuration. The operation of the actuating mechanism 22 to move the brake pads 20 into engagement with opposing planar braking surfaces 24 on the rotating disc 12 is well known and will not be discussed in further detail.

An air chamber assembly 26 supplies the input braking force to the actuating mechanism 22 in response to the brake input command. The air chamber assembly 26 includes an air chamber body 28 that outputs a pneumatic force via an air chamber actuator member 30. The air chamber actuator member 30 is preferably movable along a linear path in a direction transverse to the lateral axis of rotation 14.

The actuating mechanism 22 receives input from an actuator member 32 that is movable along a linear path in a direction parallel to the lateral axis of rotation 14. An adaptor assembly 34 interconnects the actuator members 30, 32 to translate or convert the linear motion along the path transverse to the lateral axis of rotation 14 into the linear motion along the path parallel to the lateral axis of rotation 14.

In other words, the adaptor assembly 34 converts a brake input force applied in a longitudinal direction into a brake force applied in a lateral direction. This allows the air chamber body 28 to be positioned parallel to the disc 12. The disc 12 rotates in a first plane 40 and the air chamber body 28 is positioned in a second plane 42. The second plane 42 is spaced apart from and generally parallel to the first plane 40, and the lateral axis of rotation 14 intersects both the first 40 and second 42 planes. While preferably parallel, the first 40 and second 42 planes may also be orientated in a non-parallel relationship. The adapter assembly 24 allows the air chamber assembly 26 to be positioned in such mounting configurations, and allows the air chamber body 28 to be moved further away from the disc 12 or wheel and closer to an axle beam or housing (not shown).

The adapter assembly 34 includes an adapter housing 44 that is mounted to the caliper 16 and a pivoting lever 46. The housing 44 can be fastened, welded, or joined to the caliper 16 by any method known in the art. The lever 46 is rotatably mounted on a pin 48 to pivot about a pivot axis 50. The lever 46 includes a central body portion 52 and a pair of legs 54 extending out radially from the central body portion 52. Each leg 54 extends to a distal end 56. One of the distal ends 56 is connectable to the air chamber actuator member 30 and the other distal end 56 is connectable to the other actuator 32. The lever 46 pivots about the axis 50 and translates longitudinal movement from actuator 30 to lateral movement at actuator 32.

Figure 2:
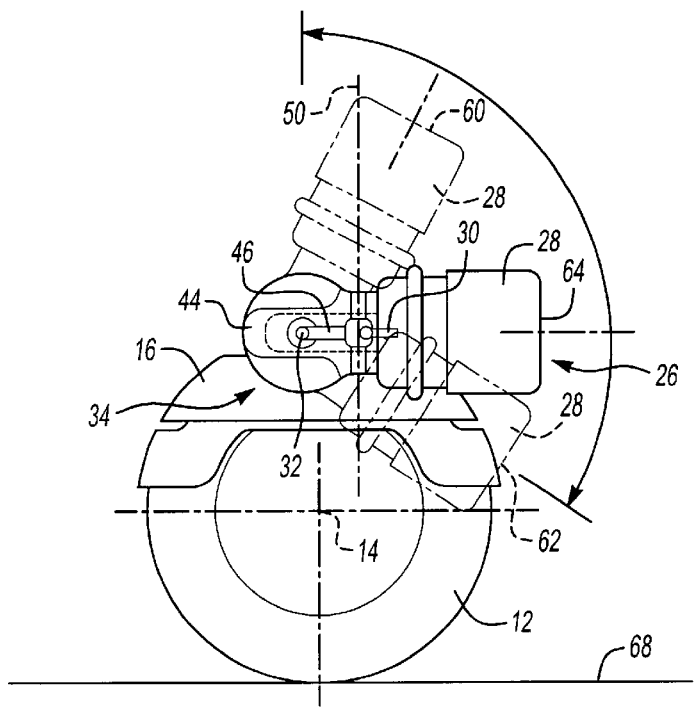
FIG. 2 is a side view of the assembly of FIG. 1 showing multiple installment positions.

As shown in FIG. 2, with the use of the adapter assembly 34, the air chamber assembly 26 can be mounted in any of various installation positions that extend radially outwardly from the lateral axis of rotation 14. For example, the air chamber 28 can be positioned in an upper radial position 60, a lower radial position 62, a tangential position 64, or any other radial position between the upper 60 and lower 62 radial positions. In the tangential position 64 the air chamber body 28 is mounted in a tangential relationship to the disc 12 and parallel to ground level 68. The variety of installation positions greatly reduces design time and cost as well as making packaging easier.

Figure 3:
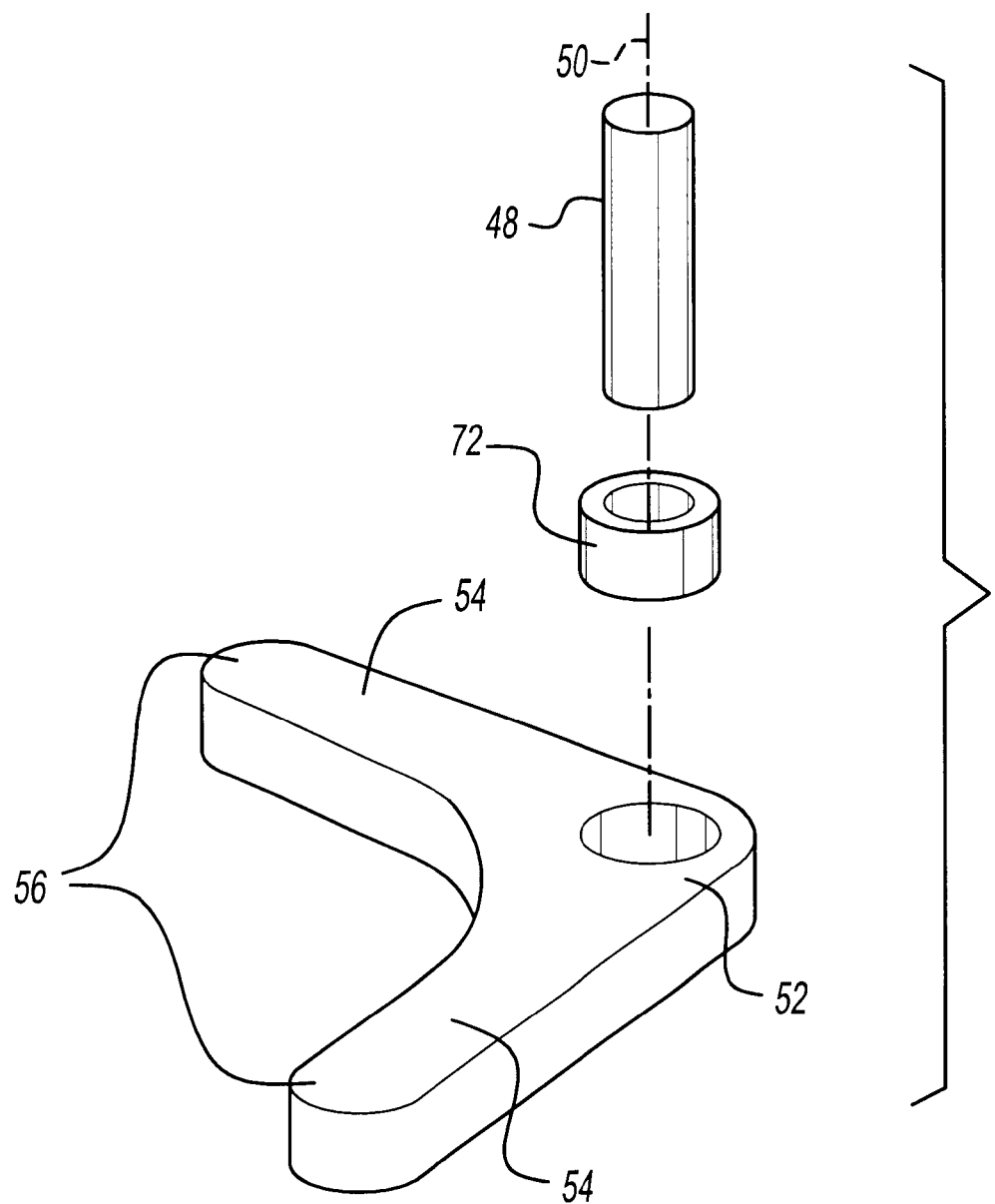
FIG. 3 is a partial exploded view of the adapter assembly of FIG. 1.

As shown in FIG. 3, the central body portion 52 of the lever 46 includes a bore 70 that receives pin 48. A bushing or bearing assembly 72 is mounted within the bore 70 to rotatably support the lever 46 for rotation about the pin 48 and relative to the adapter housing 44.

The air chamber actuator member 30 is preferably positioned generally 90 degrees relative to the actuator member 32 operably coupled to the brake pads 20. As described above, the pivoting lever 36 converts the longitudinal linear movement of the air chamber actuator member 32 into lateral linear movement of the brake pad actuator member 30. Thus, the subject invention improves packaging for disc brake assemblies 10 by providing an air chamber mounting configuration that is parallel to the rotor disc 12, and which is installable in a variety of radial and tangential mounting positions.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A disc brake assembly comprising:

a rotating disc defining a lateral axis of rotation;

a brake caliper supporting a pair of brake pads positioned on opposing sides of said rotating disc;

a first actuator movable in a direction parallel to said lateral axis of rotation to bring said brake pads into engagement with said rotating disc during a braking operation;

an air chamber having a second actuator selectively movable in a direction transverse to said lateral axis of rotation in response to an input;

an adapter interconnecting said first and second actuators to translate a brake actuation force applied in a direction transverse to said lateral axis of rotation to a brake application force applied in a direction parallel to said lateral axis of rotation wherein said adapter is pivotable about a stationary pivot axis; and an adapter housing substantially enclosing said adapter wherein said adapter housing is directly attached to said brake caliper.

2. An assembly as set forth in claim 1 wherein said adapter comprises a lever rotatably supported on at least one bearing and including a first portion connectable to said first actuator and a second portion connectable to said second actuator.

3. An assembly as set forth in claim 2 including a pin defining said pivot axis wherein said lever is supported on said pin via said bearing for pivotal movement about said pivot axis and relative to said adapter housing such that said pivot axis remains fixed relative to said adapter housing.

4. An assembly as set forth in claim 3 wherein said lever includes a center body member with a pair of radially extending legs, said pin being positioned at said center body member, said first portion formed at a distal end of one of said legs, and said second portion formed at a distal end of the other of said legs.

5. An assembly as set forth in claim 4 including an actuating mechanism comprising at least one piston tat selectively moves said brake pads into engagement with said rotating disc, said actuating mechanism being directly coupled to said first actuator and wherein said first portion of said lever is directly coupled to said first actuator such that said first actuator and said first portion of said lever are generally co-axial.

6. An assembly as set forth in claim 1 wherein said air chamber is selectively positionable between a plurality of installment positions extending out radially from said lateral axis of rotation.

7. An assembly as set forth in claim 6 wherein one of said installment positions is a tangential position with said air chamber extending in a direction generally tangential with said rotating disc.

8. An assembly as set forth in claim 1 wherein said rotating disc defines a first plane and said air chamber defines a second plane with said first and second planes being spaced apart from and generally parallel to each other with said lateral axis of rotation intersecting each of said first and second planes.

9. An assembly as set forth in claim 1 wherein said adaptor housing comprises a single piece component having a first end directly attached to said brake caliper and a second end directly attached to said air chamber such that said air chamber is positioned immediately adjacent to said brake caliper.

10. A disc brake assembly comprising:

a rotating disc having a pair of planar braking surfaces, said disc defining a lateral axis of rotation;

a brake caliper supporting a pair of brake pads positioned on opposing sides of said rotating disc;

a first actuator movable in a first liner direction parallel to said lateral axis of rotation to move said brake pads into engagement with said planar braking surfaces during a braking operation;

an air chamber having a longitudinal body extending parallel to said planar surfaces of said rotating disc and including a second actuator selectively movable in a second linear direction transverse to said lateral axis of rotation in response to an input; and an adapter assembly including a housing directly mounted to said caliper and a lever pivotally supported on a pin defining a stationary pivot axis for movement relative to said housing, said lever operably connecting said second actuator to said first actuator to convert a brake actuation force applied in said second linear direction to a brake actuation force applied in said first linear direction.

11. An assembly as set forth in claim 10 wherein stud first and second linear directions are approximately positioned ninety degrees relative to each other.

12. An assembly as set forth in claim 11 wherein said body of said air chamber is selectively positionable between a plurality of installment positions extending out radially from said lateral axis of rotation.

13. An assembly as set forth in claim 10 wherein said adapter housing comprises a single piece component having a first end directly attached to said brake caliper and a second end directly attached to said air chamber such that said air chamber is positioned immediately adjacent to said brake caliper.

14. An assembly as set forth in claim 10 wherein said lever is supported on said pin with a bearing for pivotal movement about said pivot axis such that said pivot axis remains fixed relative to said adapter housing.

15. A method of actuating a disc brake assembly installed in a vehicle comprising the steps of:

(a) providing a rotating disc defining a lateral axis of rotation and a caliper supporting a pair of brake pads positioned on opposing sides of the rotating disc;

(b) positioning an air chamber immediately adjacent to the caliper;

(c) applying a first brake input force with a first actuator, operably connected to the air chamber, in a first linear direction transverse to the lateral axis of rotation;

(d) translating the first brake input force into a second brake input force applied in a second linar direction parallel to the lateral axis of rotation with a second actuator to bring the brake pads into engagement with the rotating disc during a braking operation;

(e) connecting the first and second actuators with a lever pivotable about a stationary pivot axis to translate the first brake input force into the second brake input force; and (f) enclosing the lever within a housing having a first end directly attached to the caliper and a second end directly attached to the air chamber.

16. A method as set forth in claim 15 wherein the rotating disc rotates within a first plane and wherein step (b) further includes mounting the air chamber within a second plane that is spaced apart from and parallel to the first plane.

17. A method as set forth in claim 15 further including the steps of:

selecting one of a plurality of air chamber installment positions extending radially about the lateral axis of rotation; and mounting an air chamber in one of the installment positions during step (b).

18. A method as set forth in claim 17 wherein one of the installment positions is a tangential position and further including the step of mounting the air chamber in the tangential position such that an air chamber body extends in a direction generally tangential with the rotating disc and parallel to ground level.

19. A method as set forth in claim 15 including the step of fixing the position of the pivot axis relative to the housing.

20. A method as set forth in claim 15 including the steps of forming the lever with a central body portion with first and second legs extending radially outward from the central body portion, directly coupling the first leg to the first actuator such that a distal end of the first leg is movable in a direction coaxial with the first linear direction, and directly coupling the second leg to the second actuator such that a distal end of the second leg is movable in a direction coaxial with the second linear direction.

* * * * *

UNITED STATES PATENT AND TRADEMARK OFFICE
CERTIFICATE OF CORRECTION

PATENT NO.   : 6,698,553 B2
DATED        : March 2, 2004
INVENTOR(S)  : Varela

It is certified that error appears in the above-identified patent and that said Letters Patent is hereby corrected as shown below:

<u>Column 4,</u>
Line 29, "tat" should read as -- that --.
Line 51, "adaptor" should read as -- adapter --.

<u>Column 5,</u>
Line 12, "stud" should read as -- said --.
Line 40, "linar" should read as -- linear --.

Signed and Sealed this

Fifteenth Day of June, 2004

JON W. DUDAS
*Acting Director of the United States Patent and Trademark Office*